United States Patent [19]

Hungerford

[11] 4,066,731
[45] Jan. 3, 1978

[54] METHOD OF MAKING POLYMERIC ACRYLONITRILE FILMS

[75] Inventor: Gordon P. Hungerford, Palmyra, N.Y.

[73] Assignee: Mobil Oil Corporation, New York, N.Y.

[21] Appl. No.: 676,843

[22] Filed: Apr. 14, 1976

[51] Int. Cl.² ............................................. B29D 7/02
[52] U.S. Cl. .................................. 264/216; 264/182; 264/203; 264/210 R; 264/233; 264/289
[58] Field of Search ............... 264/182, 212, 216, 203; 260/29.6 AN

[56] References Cited

U.S. PATENT DOCUMENTS

| | | | |
|---|---|---|---|
| 3,018,157 | 1/1962 | Kovarik et al. | 264/206 |
| 3,142,715 | 7/1964 | Burk | 264/213 |
| 3,190,765 | 6/1965 | Yaan | 264/216 |
| 3,275,612 | 9/1966 | Bechtold | 264/216 |
| 3,296,016 | 1/1967 | Murphy | 264/216 |
| 3,418,406 | 12/1968 | Ball | 264/206 |
| 3,505,445 | 4/1970 | Leonard et al. | 264/182 |
| 3,729,536 | 4/1973 | Warwicker | 264/216 |

Primary Examiner—Jay H. Woo
Attorney, Agent, or Firm—Charles A. Huggett

[57] ABSTRACT

Method of preparing films of acrylonitrile polymer exhibiting very high tensile strength, stiffness, optical clarity, and outstanding gas barrier properties. Method entails extruding a hot, concentrated solution of said polymer in a solvent therefor that is water-soluble, e.g., dimethyl sulfoxide, onto a film-supporting surface, e.g., a flat surface, or a drum, which, preferably, has a low energy surface such as provided by wetting the surface with aqueous dimethyl sulfoxide, or coated with polytetrafluoroethylene, or other suitable means to thereby form a film. The resulting film is then contacted with an aqueous medium, e.g., water to remove the solvent (e.g., dimethyl sulfoxide) and partially replace it with water, this treatment being effected under conditions that will prevent the film from curling or puckering. The resulting film is composed essentially of acrylonitrile polymer and water, and is ignition resistant. This film can be then biaxially stretched in a substantially non-drying environment at 100° C or less, preferably at 50°–80° C followed by drying to remove the water, while maintaining the film under constrained conditions to prevent or limit the degree of lateral and longitudinal shrinkage. The final film thus produced has a very high tensile strength and stiffness and very low gas permeability.

20 Claims, 7 Drawing Figures

METHOD OF MAKING POLYMERIC ACRYLONITRILE FILMS

BACKGROUND OF THE INVENTION

1. Field of the Invention

This invention relates to films of polymeric acrylonitrile. More particularly, the invention relates to polyacrylonitrile films and to a method of their preparation, which films are characterized by extremely high tensile strength and stiffness, and by outstanding gas barrier properties. The invention also relates to films of acrylonitrile polymer-water, the water being present within the film in an amount of at least 20% by weight, such films being highly fire resistant.

2. Description of the Prior Art

Although polyacrylonitrile has been known and available since the later 1940's, it has not been successfully utilized commercially in film form, probably because of its "intractability", in that it cannot be melted without decomposing, so that conventional hot melt extrusion techniques are simply inapplicable.

Shaped articles of polyacrylonitrile have been described in prior patents. See, e.g., U.S. Pat. Nos. 2,858,290 and 3,094,502, which describe polymerizing acrylonitrile in dimethyl sulfoxide to provide a spinning solution of polyacrylonitrile in the foregoing solvent, followed by extrusion. See also U.S. Pat. No. 3,437,717, which describes the preparation of a film made from a copolymer of acrylonitrile and a polyalkenyl monomer, the film being prepared by dissolving the copolymer in a polar organic solvent such as dimethyl formamide or mixtures of dimethyl formamide with dimethyl sulfoxide, followed by casting the film from the foregoing solution, removing part of the solvent, stretching the film biaxially, and removing most of the remaining solvent by air drying.

SUMMARY OF THE INVENTION

I have discovered a method of preparing films of acrylonitrile polymer exhibiting very high tensile strength and stiffness, optical clarity, and outstanding gas barrier properties. This method entails applying a hot, concentrated solution of the foregoing polymer in a solvent therefor that is water-soluble (e.g., dimethyl sulfoxide) onto a film-supporting surface, e.g., a cooled, flat surface or a cooled rotating drum, to thereby form a film. An embodiment for applying the solution onto the film-supporting surface includes extrusion of the solution through a slot die as well as other means suitable for casting the solution onto a film-supporting and film-forming assembly. Desirably, the film-supporting surface is a low energy surface such as may be provided by having said surface wetted by an aqueous solution of dimethyl sulfoxide in water, or by having the surface coated with a material such as polytetrafluoroethylene, and stripping the resulting film from said surface.

The resulting film containing the solvent (e.g., dimethyl sulfoxide) is then subjected to contact with water, preferably while being maintained under constrained conditions so as to prevent or limit lateral or longitudinal shrinkage thereof, to thereby remove the solvent (e.g., dimethyl sulfoxide) present. This results in a film composed essentially of acrylonitrile polymer and water. This film per se is highly resistant to ignition because of the large amount of water present therein, and is suitable for use as a semi-permeable membrane, or as a plate separator for batteries.

I have further found that when the foregoing film is subjected to biaxial stretching under substantially non-drying environment, followed by drying the film, while under restraint so as to prevent or limit shrinkage, until substantially all of the water present has been removed, there results a final film that exhibits an exceptionally high tensile strength and stiffness and an exceptionally low permeability to gases.

BRIEF DESCRIPTION OF THE DRAWINGS

My invention will be best understood from the following detailed description taken in conjunction with the accompanying drawings wherein.

DESCRIPTION OF THE PREFERRED EMBODIMENTS

Figure 1:
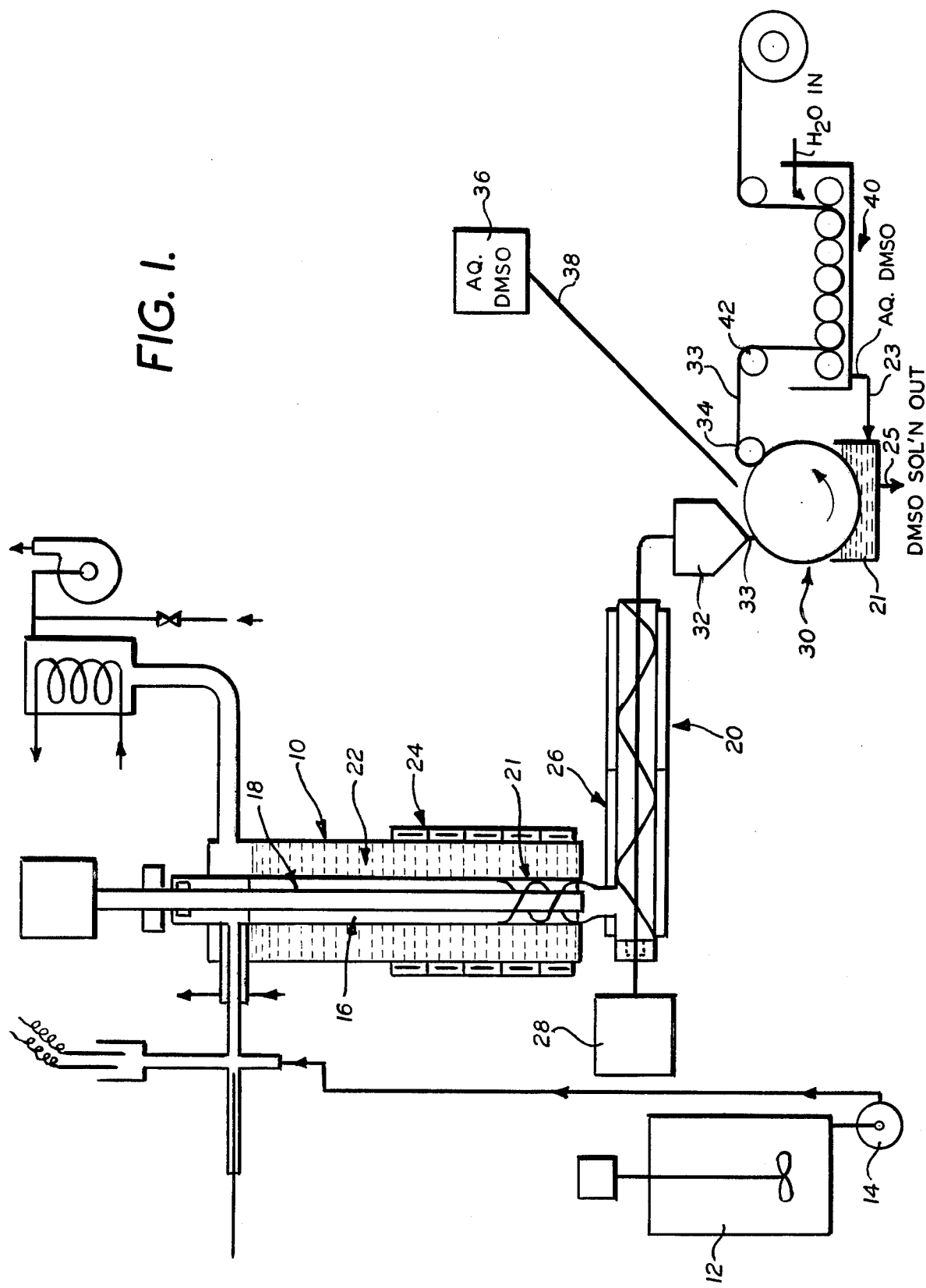
FIG. 1 is a schematic illustration of an apparatus that may be utilized in the method of my invention.

Considering the monomeric material from which the polymeric film is prepared, the preferred monomer is, of course, acrylonitrile.

In the following discussion, reference will be to films made from the homopolymer of acrylonitrile. It is, however, to be understood that my invention contemplates, in addition, the preparation of films that are made from copolymers of acrylonitrile with other ethylenically unsaturated monomers that are copolymerizable therewith, wherein said copolymers predominate in units derived from the acrylonitrile monomer.

Suitable ethylenically unsaturated monomers copolymerizable with acrylonitrile include, for example, alkyl acrylates such as methyl acrylate, butyl acrylate, and the like. Generally, I prefer to use polyacrylonitrile homopolymer. Where a copolymer is employed, I prefer that the units in said copolymer derived from the acrylonitrile monomer be present in an amount of at least about 80 percent by weight, and preferably in an amount of at least 95 percent by weight.

The polyacrylonitrile (or acrylonitrile copolymer, as the case may be) may be prepared in any conventional manner, as by emulsion polymerization, suspension polymerization, or solution polymerization. However, inasmuch as the method of my invention utilizes a solution of polyacrylonitrile in a solvent that is water soluble as the precursor of the polymer film, it clearly is most efficient to effect the polymerization in solution wherein the solvent is dimethyl sulfoxide.

As noted, the preferred solvent employed for the solution polymerization is dimethyl sulfoxide. Alternatively, the solvent may be succinonitrile or a mixture of dimethyl sulfoxide and dimethyl sulfone wherein at least 50 percent by weight of said mixture is dimethyl sulfoxide.

Solution polymerization of acrylonitrile in dimethyl sulfoxide is known in the art. See, e.g., U.S. Pat. No. 3,094,502 previously referred to.

It is generally advantageous to polymerize the acrylonitrile monomer when dissolved in the solvent, preferably dimethyl sulfoxide, in an amount between about 30 and 60 percent by weight, based on the total weight of the solution. The optimum concentration of dissolved monomer for employment in specific instances may vary with such factors as the molecular weight which is desired to be obtained in the polymerized product, the concomitant viscosity that is desired to be achieved in the directly formed extruding solution, and the extrusion conditions.

In preparing the film-forming system, the polymerization is facilitated by use of a suitable vinyl polymerization catalyst.

By the expression "vinyl monomer polymerization catalyst" is meant the well known free radical catalysts conventionally used in vinyl monomer polymerization processes. In this class, there are included organic azo compounds as disclosed in U.S. Pat. No. 2,471,959 wherein the azo, —N=N—, group is acyclic and bonded from both of the nitrogens to carbons which are aliphatic in nature and at least one of which carbons is tertiary; diacyl or diaryl peroxides, such as benzoyl peroxide, t-butyl perbenzoate, cyclohexanone peroxide, and others. They may be thermally decomposed or a redox system may be used, such as a peroxide with $SO_2$ and an oxidizable heavy metal iron, such as $Fe^{++}$, or an N,N'-dialkyl aniline. Salts of perdisulfuric acid are also useful in a redox system. The catalyst may be employed in a conventional manner and in an amount as will be apparent to those skilled in the art. Generally, from 0.1 to about 1% by weight based on the monomer is preferred.

The extruded melt desirably should be substantially free of the volatile monomer. This can be accomplished by removing the residual monomer from a normal polymerization, as by vacuum distillation, or by conducting a post-polymerization at elevated temperatures to attain substantially 100% conversion.

Ordinarily, the polymerization may be terminated with formation of a suitable film-forming solution in a time period which rarely exceeds 60 minutes and often may be as short as about 40 minutes or less.

Advantageously, the film-forming systems may be prepared by polymerizing the dissolved monomeric material with catalytic assistance under atmospheric pressure at a temperature between about 80° and 150° C for a period of time which is between about 30 and 60 minutes. The equipment employed for the polymerization should be equipped with an efficient means for agitation.

If the polyacrylonitrile is prepared by other than solution polymerization in dimethyl sulfoxide, an embodiment for practice of this invention includes recovering the polymer from the solution, washing the polymer, and then dissolving it in dimethyl sulfoxide.

In general, it is preferred that the percent conversion of acrylonitrile monomer to polyacrylonitrile be at least about 90%, and preferably of the order of 95-98%. The polymer will generally have a molecular weight of at least about 80,000. More particularly, the inherent viscosity of the polymer at 0.5 g/100 ml dimethyl sulfoxide, should be from about 0.85 to 1.7.

The polymer solution is then extruded through a suitable extrusion means, e.g., a slot die and cast onto a cool surface. In instances where it is desired to produce a thin smooth film, it is preferred that the drum surface be one that is not easily wet by the extrudate to avoid objectionable striation in the product film. Embodiments to effect same include continuously wetting the surface with an aqueous solution of dimethyl sulfoxide, or using a low energy casting surface, e.g., a drum coated with a polytetrafluoroethylene.

The concentration of the casting solution (that is to say, the solution of polyacrylonitrile in the solvent, e.g., dimethyl sulfoxide) is preferably at least 30 percent by weight of polyacrylonitrile, and preferably from about 40 to 60 percent by weight.

The concentration of the aqueous solution of dimethyl sulfoxide that may be utilized to continuously wet the flat casting surface may be from about 30 to 70 percent by weight of dimethyl sulfoxide.

As a result of the foregoing casting operation, one obtains a polyacrylonitrile film that contains therein substantial amounts of the solvent (e.g., dimethyl sulfoxide). Typically, this film will contain at least about 40 percent by weight of the solvent and, preferably, from about 50 to 65 percent by weight thereof.

In accordance with a further aspect of this invention I have discovered that when the film is contacted with an aqueous medium as for example by countercurrent extraction with an aqueous medium to remove the solvent (e.g., dimethyl sulfoxide), there results a film product having high resistance to ignition as a result of its high water content.

As noted, it is desirable that the treatment (e.g., countercurrent water treatment) of the film to remove or partially replace the solvent with water be carried out under conditions wherein the film is maintained under constraint. Thus, the film should be prevented, during the period of the water treatment, from curling or puckering, so that it remains substantially flat. Thus, non-flatness that would result from puckering or curling would interfere with subsequent processing operations.

After the foregoing water treatment, there results a film composed of polyacrylonitrile and water, with the water typically being present in an amount of from about 20-75 percent by weight. It should be noted that this water is not free. Rather, it appears that the water has entered the interstices and voids present in the film on a molecular scale so that it is an integral part of the film.

Such film is, by virtue of its high water content, highly resistant to ignition. This film has a wide variety of end use applications. For example, such a film is highly suitable as a plate separator for batteries, as a semi-permeable membrane for use in dialysis or reverse osmosis, as a transparent wrap for produce, etc.

In accordance with a further aspect of my invention, I have discovered that the foregoing film, composed essentially of polyacrylonitrile and water, may subsequently be transformed by a series of steps into a final film consisting of polyacrylonitrile, which final film exhibits extraordinarily high tensile strength and extraordinarily low gas permeability.

In accordance with this aspect of my invention, the foregoing film is first subjected to biaxial stretching. The biaxial stretching is preferably carried out in a moist environment, e.g., in the presence of steam, moist gas, or in hot water. The biaxial stretching can be carried out in a one-step operation wherein the film is simultaneously subjected to stretching in two directions that are at right angles to one another. Alternatively, the biaxial stretching can be carried out in stepwise fashion, as first by longitudinal stretching and thereafter by lateral stretching, or vice versa. In general, the biaxial stretching should be carried out such that the amount of stretch imparted to the film in each direction is at least about 1.5 times the original dimension prior to stretching and, generally, from about 1.5 to about 4 times. Preferably, the biaxial stretching is carried out such that the stretch in each direction is at least two times the original dimension.

One means for effecting biaxial stretching simultaneously in both directions is to clamp the film between two plates, one plate having a large circular hole therein and the other plate having a small hole for the introduction of compressed air. The foregoing assembly is then immersed in hot water. At water temperature of at least 40° up to about 100° C, compressed air is admitted under sufficient pressure to cause the film to expand through the large hole so as to form a "bubble". Within that temperature range, it is highly preferable that the higher the temperature the more promptly should the air admittal be initiated. For example, at above 70° C, the air admitted is desirably substantially immediate. The degree of stretch is, of course, determined by the size of the ultimate bubble. After a bubble of desired size has been formed, and while maintaining the air pressure so as to retain the bubble, the entire assembly may then be immersed in cold water so as to "fix" the bubble structure. The bubble portion may then be cut away (this being the portion that was subjected to true biaxial stretching) and then dried while under restraint, as in an oven. During the drying, the film, which initially exhibited the spherical curvature defining the bubble, will shrink and become flat as it loses its water. The resultant flat film is dimensionally stable and has very high tensile strength and extremely low gas permeability.

Rather than the foregoing "bubble" technique, other means well known to the art may be used. Thus, the biaxially oriented films embodied herein may, for example, be produced by sequentially orienting the film as, for example, stretching in a longitudinal direction (machine direction) followed by stretching in a lateral direction (transverse direction) or by subjecting the film to orientation simultaneously in both the longitudinal and transverse direction. Specific apparatus and techniques for effecting biaxial orientation of the film embodied herein include, for example, the drafter-tenter frame arrangement as disclosed in U.S. Pat. No. 3,437,717 for sequentially imparting machine direction and transverse direction orientation; and the various means disclosed in, for example, the articles by J. Jack in British Plastics, June 1961, pages 312–317 and July 1961, pages 391–394 for sequential or simultaneous biaxial orientation of plastic films.

I have discovered that if the film which may contain, e.g., 45% water as it emerges from the washer, is preheated to a stretching temperature, e.g., 100° C, in hot water or steam and is allowed to remain at that temperature for a substantial period of time, say two minutes, its water content will drop substantially. Film having a low water content, e.g., as low as about 20%, normally provides difficulty in stretching without breaking. Moreover, such a film develops a white or bluish haze. Thus, to achieve smooth stretching and a haze-free final product, the "wet" film (i.e., film composed of polyacrylonitrile and water) should be rapidly heated while preventing substantial evaporation from occurring, and then stretching the film immediately, before the film can adjust to its new environment and lose much of its water. The temperature at which the stretching is effected should be less than 200° F and, preferably less than 160° F. Preferably, after the film has been heated to the desired stretching temperature, the stretching should be commenced immediately, e.g., less than three seconds after the desired stretching temperature has been attained.

The oriented film obtained after the biaxial stretching will still contain water therein. If this film is dried without being maintained under restrained conditions, it shrinks appreciably. Thus, it can be used as a shrinkable film for packaging. It can then be dried while on the package, as by the application of heat. Alternatively, it can be permitted to dry during storage and/or shipping. The final dry film has excellent gas-barrier properties.

Apart from an end use as a shrinkable film, it is preferred to carry out drying of the oriented film while either preventing it from shrinking or else permitting it to shrink only a controlled amount.

The particular drying technique is not critical. Thus, the following different modes of drying have all proven satisfactory: 30 seconds in high velocity impinging air at 350° F; 15 seconds exposure three inches away from a battery of 1000 watt quartz tube radiant heaters spaced one inch apart; or 2 minutes in a Fisher Convection oven at 350°–400° F (very low air velocity).

The process of my invention will now be described in further detail, with reference to the accompanying drawings.

Referring to FIG. 1, there is shown my overall apparatus, which includes a polymerization reactor generally designated by the reference numeral 10, an extruder 20, a casting drum 30, and a washer 40.

Considering first the polymerization phase, suitable monomer (acrylonitrile), solvent (dimethyl sulfoxide), and polymerization initiator are admixed in monomer feed tank 12. They are then pumped by pump 14 to tubular reactor 10 and into the top of the annular reaction zone 16. The reactor 10 is equipped with an agitator 18, equipped with a pair of screw flight scraper blades 21.

Tubular reactor 10 is surrounded with a water jacket 22 wherein the water can be heated to boiling, as by heaters 24 and the pressure in the jacket 22 is controlled by means of a vacuum pump.

Extruder 20 withdraws polymer from the bottom of the reactor 10, and as it does so, the reactor is maintained charged with monomer feed by a level controller [not shown].

Screw extruder 20 is jacketed with heaters 26, and is driven by a variable speed drive 28. Accordingly, as polymer dissolved in dimethyl sulfoxide enters the extruder from the reactor it is passed through the extruder, into slot extrusion die 32, and is extruded therefrom in the form of a thin polymeric film. This film extrudate is cast upon drum 30, which drum rotates in a counter clockwise direction, thereby passing the cast film 33 between the drum and nip roll 34.

In accordance with an important aspect of the invention, the casting drum 30 is continuously wetted with an aqueous solution of dimethyl sulfoxide, or alternatively, the drum is provided with a coating of polytetrafluoroethylene. If the aqueous dimethyl sulfoxide is used, as schematically shown in FIG. 1, tank 36 contains aqueous dimethyl sulfoxide solution, which solution passes from the tank through line 38 and directly to the casting drum 30.

A container 21 is disposed beneath casting drum 30. In this container is aqueous dimethyl sulfoxide, which may be continuously introduced via conduit 23. As the drum rotates, the aqueous dimethyl sulfoxide in container 21 helps to coagulate the film on the drum and also serves as a first washing for the film, thereby enhancing the film's strength and rendering it more readily strippable from the drum. Conduit 25 permits the continuous withdrawal of aqueous dimethyl sulfoxide from container 21.

Figure 2:
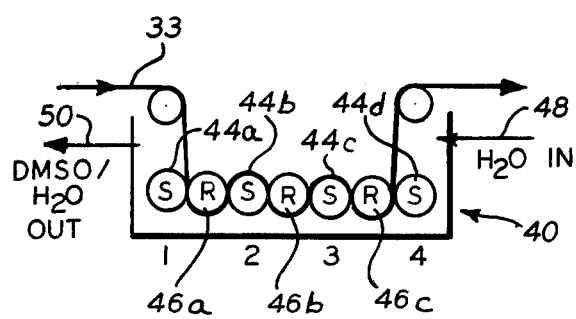
FIG. 2 is an illustration in greater detail of the apparatus that is employed in the water washing of the film of polymeric acrylonitrile.

As shown in each of FIGS. 1 and 2, the film 33 then passes to the washer 40 via guide roll 42.

Washer 40 contains therein a multiplicity of pairs of steel-rubber nip rolls for the purpose of conveying the polymer film through the washer while at the same time restraining the film from both longitudinal and lateral shrinkage.

As shown in FIG. 2, the washer contains four steel rolls 44a, 44b, 44c, 44d, and three rubber rolls 46a, 46b, 46c disposed between the steel rolls and in contact with them. The four steel rolls are geared together and positively driven so as to each turn at the same speed, thereby preventing substantial longitudinal shrinkage of the polymer film. The three rubber rolls 46 are idler rolls. By virtue of the tight frictional engagement between adjacent rolls, any tendency toward lateral shrinkage of the polymer film is effectively reduced.

Figure 3:
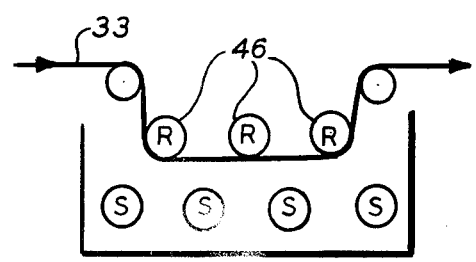
FIGS. 3 and 4 are schematic illustrations of the washing apparatus in raised and lowered positions so as to easily accommodate the film.
Figure 4:
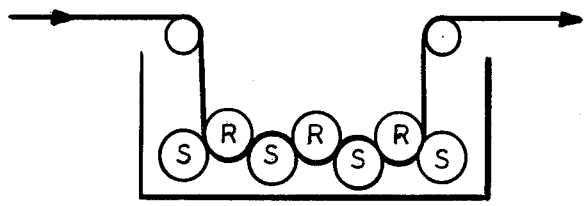

I have found that it is advantageous to mount the rubber rolls 46 on vertical slidable supports (not shown) so that these rollers can readily be raised or lowered. As illustrated in FIG. 3, the rubber rolls are raised so as to permit easy introduction of the polymer film 33. The three rubber rolls 46 are then lowered (FIG. 4) so as to "nip" the polymer film tightly between the rubber rolls 46 and the steel rolls 44.

As illustrated in each of FIGS. 1 and 2, fresh water is introduced into washer 40 via conduit 48. The polymer film 33, rich in dimethyl sulfoxide, is shown entering washer 40 at the left hand side. Accordingly, a countercurrent washing is effected, with the water, as it progresses from right to left becoming ever richer in dimethyl sulfoxide and correspondingly, with the polymer film, rich in dimethyl sulfoxide as it enters from the left, gradually losing the dimethyl sulfoxide and having it replaced with water as the film progresses from left to right. The countercurrent wash solution, rich in dimethyl sulfoxide, is removed from the left side of the wash apparatus 40 by means of conduit 50.

Figure 5:
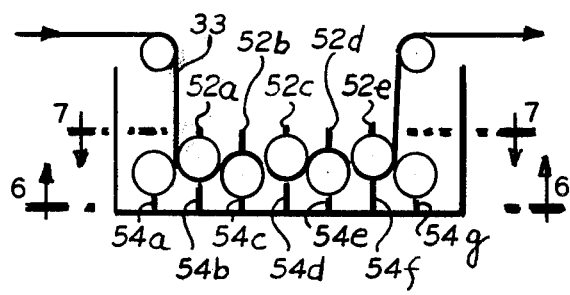
FIG. 5 is a schematic illustration of a baffle arrangement for promoting the washing in well defined stages.
Figure 6:
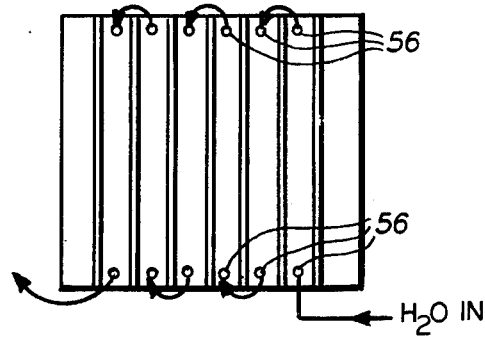
FIG. 6 is a plan view taken along the line 6—6 of FIG. 5.
Figure 7:
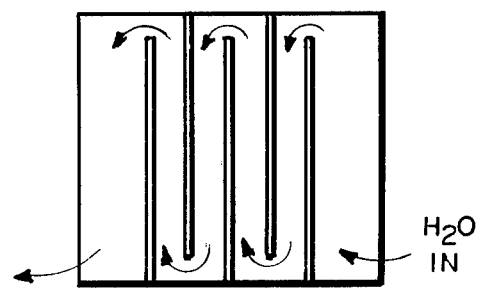
FIG. 7 is a plan view taken along the line 7—7 of FIG. 5.

In accordance with a further aspect of my invention, I have found that the foregoing countercurrent washing is best achieved when it is carried out in well defined stages. To achieve this, and as is illustrated in FIG. 5, there are provided transversely mounted squeegees or baffles 52, 54. Squeegees 52a, 52b, 52c, 52d and 52e, are mounted above the rolls, and squeegees 54a, 54b, 54c, 54d, 54e, 54f, 54g are mounted below the rolls. These transverse squeegees effectively prevent the wash water from flowing freely from one end of the tank to the other. Thus, the squeegees divide the washer into 12 compartments, six on the bottom (below polymer film 33) and six on the top. As shown in FIG. 6, water is permitted to flow from one bottom compartment to another bottom compartment via ports 56 in the bottom connected by hoses (not shown). Also, water is permitted to flow from one top compartment to another top compartment via gaps between the top squeegees and the edge. That is to say, and as shown in FIG. 7, the top squeegees do not extend across the entire width of the washer tank, thereby permitting labyrinthine flow of the water.

It should be noted that inasmuch as the polymer film is somewhat narrower than the width of the tank rolls, the water on the top side will come in contact with the water on the bottom side outboard of the edges of the polymeric film, so that the bottom and top wash water are not completely distinguishable.

As previously pointed out, after the polymer has been water washed there results a product that is composed essentially of polyacrylonitrile and water, with the water typically being present in an amount of from about 25 to 50 percent by weight. It is strong, stiff, tough, transparent, and essentially water-white.

The foregoing film if not employed as is, may be subsequently treated so as to remove the water and obtain a final film consisting essentially of polyacrylonitrile. To that end, the film is first subjected to biaxial stretching typically two and a half fold in both the longitudinal and lateral direction. As noted previously, the biaxial stretching may be carried out in either hot water at, e.g., 50° to 80° C, or in a moist atmosphere, typically steam/air mixtures. After the biaxial stretching the film should be dried under restrained conditions, as by drying in hot air at 100° to 200° C. Drying is preferably followed by heat setting for a few seconds at, e.g., 200° C.

Film made by such process generally has an oxygen permeability of 0.005 – 0.03cc/(day)(100 in$^2$) (atm) at 1 mil and a water vapor permeability of about 0.1 – 0.3g/(day)(100 in$^2$). The modulus of elasticity in tension is about 600,000 – 800,000 psi, and the tensile strength is about 20,000 – 30,000 psi with an elongation at break of 50–70%. The films do not appear to shrink at 290° F.

The following example will further illustrate my invention. The apparatus utilized was similar to that of FIG. 1. All parts are by weight unless otherwise indicated.

EXAMPLE

The following ingredients were mixed at room temperature.

8.38 liters of acrylonitrile (6.75Kg) containing MEHQ (methyl ether of hydroquinone) inhibitor (35–45 parts/million parts of the acrylonitrile).

8.88 liters of dimethyl sulfoxide (9.77Kg).

17.0 g of alpha, alpha'-azo diisobutyronitrile.

No precautions were taken to exclude oxgyen.

This mixture was pumped to the top of a cylindrical reactor, i.e., a 3 inch (I.D.) carbon steel tube 30 inches long equipped with a water jacket and a close fitting screw type agitator (double flighted screw, 6 inch pitch, root diameter 1 ½ inches), at a rate of about 70 ml/min. The jacket temperature was maintained at about 85° C, and the speed of the agitator was 22 RPM. The reactor tube was vented to the atmosphere to permit air in the tube to escape as the reactor was filled.

When the reactor was full, the agitator speed was increased to 74 RPM, and a 1 inch diameter, 20 inch long extruder connected to the bottom of the reactor tube was started in operation at a rotational speed of about 30 RPM. The extruder barrel temperature was maintained at 120° C. The discharge from the extruder was continuously passed into a slot die maintained at 110° C. The resulting extruded sheet was continuously laid down on the surface of a water-cooled rotating casting drum maintained at a temperature of about 10° C. The drum was rotated at such speed that the film or polymer solution on the surface of the drum was about 0.01 inch thick. The surface of the drum was continuously kept wet with a 50% solution of DMSO in water in order to prevent generation of transverse striations in the cast sheet.

The cooled film, which was quite strong but very rubbery, was continuously stripped off the casting drum and conducted through a washing device consisting of a series of seven 2-inch diameter rollers (steel, rubber, steel, rubber, steel, rubber, steel, all operating in contact, and all driven at the same speed) immersed in flowing tap water at about 10° C. The resulting sheet, which was strong, tough, transparent, and stiff, was wound up to form a roll. The final wet sheet (8.5 mils thick) after further washing, contained 55% polyacrylonitrile having an inherent viscosity of 1.3 (0.5g/100 ml DMSO) and 45% volatiles consisting essentially of water and perhaps small amounts of dimethyl sulfoxide and acrylonitrile monomer.

A piece of the above wet sheet was then clamped between two gasketed metal plates, one of which had a 5 inch diameter circular hole in it and the other of which had a hole for the introduction of compressed air. This assembly, with the sheet in it, was immersed in water at 75° to 85° C. Compressed air was immediately admitted under sufficient pressure to cause the sheet to expand out through the five inch hole to form a "bubble" about 4 1/16 inches high, thereby stretching the sheet biaxially. Then the assembly was transferred, while maintaining air pressure in the bubble, to a cold water tank to immobilize the structure of the bubble.

The thus blown sheet was removed from the assembly and a 4 ¾ inch diameter embroidery hoop was used to clamp the "crown" of the hat-shaped blown sheet, where the stretching orientation was substantially biaxial and substantially balanced in both directions (about three fold stretch in each direction). After trimming away the undesired edge portions of the "hat", the embroidery hoop with its piece of wet oriented film was dried in a 200° C low air velocity oven for 120 seconds. During this drying operation, the film, which had possessed a spherical curvature, shrank, became flat and taut, lost its water, and became dimensionally stable.

The resultant film, and other films made by the same technique, were from 0.00032 to 0.00062 inches thick, were clear and water-white, and had the following properties:

Young's modulus (Kpsi); 725–833
Ultimate Tensile Strength (Kpsi); 28–39
Elongation at Break (%); 36–55
Oxygen permeability (dry oxygen at room temp: cc/(100 in$^2$) (day) (atm); 0.006
Water vapor permeability
(50% RH, 73° F); g/(100 in$^2$) (day); 0.11
Shrinkage at 290° F; Negligible Variations can, of course, be made without departing from the spirit and scope of the invention.

What is claimed is:

1. A method for making a biaxially orientable film comprising applying onto a film supporting cooled surface a concentrated solution of an acrylonitrile polymer in a solvent therefor that is water soluble to provide a film comprising said polymer and said solvent, contacting the resulting film with an aqueous medium to substantially remove and replace with water the solvent in the film, and recovering as the resultant film a biaxially orientable film consisting essentially of the acrylonitrile polymer and from about 20 to 75% by weight water.

2. A method as defined in claim 1, wherein the film-supporting surface, onto which the concentrated solution is extruded, is a low energy surface not easily wet by the extrudate.

3. A method, as defined in claim 1, wherein the film-supporting surface is wetted with an aqueous solution of dimethyl sulfoxide.

4. A method, as defined in claim 1, wherein the film-supporting surface is polytetrafluoroethylene.

5. The method of claim 1 wherein the solution of the acrylonitrile polymer applied to the supporting surface is acrylonitrile homopolymer dissolved in dimethyl sulfoxide as the sole solvent for the homopolymer.

6. The method, as defined in claim 1, wherein the acrylonitrile polymer is a copolymer of acrylonitrile with an alkyl acrylate, said copolymer containing units derived from acrylonitrile in amount of at least about 80% by weight of the copolymer and the copolymer is dissolved in dimethyl sulfoxide.

7. The method, as defined in claim 1, wherein the film-supporting surface is a cooled surface.

8. The method, as defined in claim 1, wherein the film-supporting surface is a smooth surface.

9. The method, as defined in claim 1, further comprising biaxially stretching said film consisting essentially of the acrylonitrile polymer and water.

10. The method of claim 9 wherein the film is biaxially stretched at least about 1.5 times its dimensions in both directions prior to being biaxially stretched.

11. The method of claim 10 wherein the film is biaxially stretched at about 1.5 to about 4 times its dimensions in both directions prior to being biaxially stretched.

12. The method of claim 9 wherein the biaxial stretching is effected in a substantially non-drying environment.

13. The method of claim 9 wherein the biaxial stretching is effected in a moist atmosphere or in hot water.

14. The method of claim 1 wherein the solvent removal from the film is effected by counter-current extraction with water.

15. The method of claim 9 wherein the biaxially stretched film is dried to substantially remove water therefrom.

16. The method of claim 15 wherein the biaxially stretched film is dried without maintaining the film under restraint.

17. The method of claim 15 wherein the biaxially stretched film is dried while maintained under restraint.

18. A method for making a biaxially orientable film comprising casting a film of a hot concentrated solution of polyacrylonitrile in dimethyl sulfoxide onto a cooled surface coated with a film of polytetrafluoroethylene or wetted with an aqueous solution of dimethyl sulfoxide to provide a film comprising polyacrylonitrile and solvent, contacting the resulting film with water while maintaining the film under conditions that substantially prevent it from curling and puckering to substantially remove the dimethyl sulfoxide from the film and incorporate from about 40–60% by weight water into said film, and recovering therefrom a film consisting essentially of polyacrylonitrile and about 40 to about 60% by weight water.

19. A method, as defined in claim 18, further comprising biaxially orienting the film consisting essentially of polyacrylonitrile and water.

20. A method, as defined in claim 19, wherein the biaxially oriented film is dried to substantially remove water therefrom.

* * * * *